United States Patent
Yokawa et al.

(10) Patent No.: US 11,196,958 B2
(45) Date of Patent: Dec. 7, 2021

(54) DISPLAY DEVICE AND THIN TELEVISION SET

(71) Applicant: Funai Electric Co., Ltd., Daito (JP)

(72) Inventors: Akira Yokawa, Daito (JP); Akihiro Fujikawa, Daito (JP); Yasuyuki Fukumoto, Daito (JP); Yuto Suzuki, Daito (JP)

(73) Assignee: Funai Electric Co., Ltd., Daito (JP)

( * ) Notice: Subject to any disclaimer, the term of this patent is extended or adjusted under 35 U.S.C. 154(b) by 793 days.

(21) Appl. No.: 14/091,936

(22) Filed: Nov. 27, 2013

(65) Prior Publication Data

US 2014/0152907 A1    Jun. 5, 2014

(30) Foreign Application Priority Data

Nov. 30, 2012   (JP) ............................. JP2012-261898

(51) Int. Cl.
*H04N 5/64* (2006.01)
*F21V 8/00* (2006.01)

(52) U.S. Cl.
CPC ............ *H04N 5/64* (2013.01); *G02B 6/0088* (2013.01)

(58) Field of Classification Search
USPC .......................................................... 348/836
See application file for complete search history.

(56) References Cited

U.S. PATENT DOCUMENTS

| 5,531,950 A * | 7/1996 | Kimura ............... B29C 37/0078 264/135 |
| 7,586,744 B2 | 9/2009 | Okuda |
| 7,595,983 B2 | 9/2009 | Okuda |
| 8,228,446 B2 | 7/2012 | Fujikawa |
| 2006/0182948 A1 * | 8/2006 | Watase ..................... C09D 5/38 428/323 |
| 2007/0263135 A1 | 11/2007 | Li |
| 2008/0043413 A1 * | 2/2008 | Okuda .............. G02F 1/133308 361/679.01 |
| 2009/0140963 A1 | 6/2009 | Okumura et al. |
| 2011/0199723 A1 | 8/2011 | Sato |

FOREIGN PATENT DOCUMENTS

| CN | 101448376 A | 6/2009 |
| JP | 11-119678 A | 4/1999 |
| JP | 2003-15150 | 1/2003 |
| JP | 2004-133241 A | 4/2004 |
| JP | 2005-340965 A | 12/2005 |
| JP | 2009-53399 A | 3/2009 |
| JP | 4581726 B2 | 11/2010 |
| WO | WO 2010/086938 A1 | 8/2010 |

* cited by examiner

*Primary Examiner* — Mikhail Itskovich
(74) *Attorney, Agent, or Firm* — Crowell & Moring LLP

(57) ABSTRACT

This display device includes a display panel including a rear side holding member made of resin, holding a display cell from the rear side and a substrate mounting member made of sheet metal, mounted with a circuit substrate, while the substrate mounting member made of sheet metal includes a drawn portion formed by a first protruding portion, and the rear side holding member made of resin includes a second protruding portion corresponding to the first protruding portion on a portion corresponding to the drawn portion of the substrate mounting member made of sheet metal.

15 Claims, 9 Drawing Sheets

DISPLAY DEVICE AND THIN TELEVISION SET

BACKGROUND OF THE INVENTION

Field of the Invention

The present invention relates to a display device and a thin television set, and more particularly, it relates to a display device and a thin television set each including a display panel.

Description of the Background Art

A display device including a display panel is known in general, as disclosed in International Patent Application Publication WO2010/086938.

International Patent Application Publication WO2010/086938 discloses a display device including a display panel on which a picture is displayed and a cabinet configured to hold the display panel. In this display device, the display panel includes various optical members, and the various optical members are conceivably held from the rear side by a plate-like rear side holding member.
In the conventional display device disclosed in International Patent Application Publication WO2010/086938, the rear side holding member configured to hold the optical members may be made of resin.

In the display device according to International Patent Application Publication WO2010/086938, however, the rigidity of the rear side holding member is disadvantageously easily reduced in the case where the rear side holding member is made of resin.

SUMMARY OF THE INVENTION

The present invention has been proposed in order to solve the aforementioned problem, and an object of the present invention is to provide a display device and a thin television set each capable of suppressing a reduction in the rigidity of a rear side holding member.

In order to attain the aforementioned object, a display device according to a first aspect of the present invention includes a display panel including a rear side holding member made of resin, holding a display cell from the rear side and a substrate mounting member made of sheet metal, mounted on the rear side holding member made of resin, mounted with a circuit substrate, while at least the rear side holding member made of resin constitutes a rear housing, the substrate mounting member made of sheet metal includes a drawn portion formed by a first protruding portion, and the rear side holding member made of resin includes a second protruding portion corresponding to the first protruding portion on a portion corresponding to the drawn portion of the substrate mounting member made of sheet metal.

As hereinabove described, the display device according to the first aspect of the present invention is provided with the substrate mounting member made of sheet metal, mounted on the rear side holding member made of resin, whereby the rear side holding member made of resin is reinforced by the substrate mounting member made of sheet metal, and hence a reduction in the rigidity of the rear side holding member made of resin can be suppressed. Thus, the rigidity required as the rear housing can be easily ensured even in the case where the rear side holding member made of resin constitutes the rear housing. Furthermore, the substrate mounting member made of sheet metal and the rear side holding member made of resin are provided with the first protruding portion and the second protruding portion, respectively, whereby the rigidity of the substrate mounting member made of sheet metal and the rear side holding member made of resin can be increased. In addition, the second protruding portion of the rear side holding member is formed to correspond to the first protruding portion of the substrate mounting member, whereby the rear side holding member and the substrate mounting member can be assembled in a state where the first protruding portion and the second protruding portion are in contact with each other, and hence the substrate mounting member and the rear side holding member can be tightly fixed to each other. Moreover, the rear side holding member is employed as the rear housing, whereby the number of components can be reduced, and the structure of the display device can be simplified, unlike the case where a rear housing covering the rear side holding member from the rear side is separately provided.

In the aforementioned display device according to the first aspect, the rear side holding member made of resin preferably includes a region formed by an opening or a notch, and the substrate mounting member made of sheet metal is preferably arranged in the region formed by the opening or the notch of the rear side holding member made of resin. According to this structure, the substrate mounting member made of sheet metal is arranged in the region formed by the opening or the notch of the rear side holding member, whereby the substrate mounting member made of sheet metal can be easily mounted on the rear side holding member made of resin.

In the aforementioned display device according to the first aspect, the drawn portion formed by the first protruding portion is preferably arranged on the outer periphery of the substrate mounting member made of sheet metal, and the second protruding portion is preferably arranged on a portion of the rear side holding member made of resin corresponding to the outer periphery of the substrate mounting member made of sheet metal. According to this structure, the second protruding portion of the rear side holding member is formed to correspond to the first protruding portion arranged on the outer periphery of the substrate mounting member, and hence the rear side holding member and the substrate mounting member can be easily assembled in the state where the first protruding portion and the second protruding portion are in contact with each other.

In the aforementioned structure having the rear side holding member formed by the opening or the notch, the display device preferably further includes a cover member made of resin, arranged in the region formed by the opening or the notch of the rear side holding member, covering the substrate mounting member from the rear side in a state where the rear surface of the rear side holding member is exposed, and the rear side holding member made of resin and the cover member made of resin preferably constitute the rear housing. According to this structure, the rigidity of the rear housing can be further increased by the cover member made of resin, unlike the case where only the rear side holding member made of resin constitutes the rear housing.

In the aforementioned display device having the rear side holding member formed by the opening or the notch, the rear side holding member made of resin preferably has the region formed by the opening having a rectangular shape, and the substrate mounting member made of sheet metal preferably has a rectangular shape, is preferably mounted with the circuit substrate having a rectangular shape, and is preferably arranged in the region formed by the opening having the rectangular shape of the rear side holding member made of resin. According to this structure, unlike the case where the region is formed by the notch, the region is formed by the opening having the rectangular shape, so that the high rigidity of the rear side holding member can be maintained. Furthermore, the substrate mounting member made of sheet metal, having the rectangular shape is arranged in the region formed by the opening having the rectangular shape of the rear side holding member made of resin, whereby the circuit substrate having the rectangular shape can be easily mounted on the substrate mounting member.

In the aforementioned display device according to the first aspect, the circuit substrate is preferably grounded through the substrate mounting member made of sheet metal. According to this structure, the circuit substrate can be easily grounded simply by mounting the circuit substrate on the substrate mounting member made of sheet metal, configured to reinforce the rear side holding member made of resin.

In the aforementioned display device according to the first aspect, a groove-like recess portion is preferably formed on a portion of the rear side holding member other than a portion formed with the second protruding portion. According to this structure, the rigidity of the rear side holding member made of resin can be further increased by the groove-like recess portion.

In this case, a stiffening rib extending in a direction intersecting with the groove-like recess portion is preferably formed inside the groove-like recess portion. According to this structure, the rigidity of the groove-like recess portion can be increased by the stiffening rib, and hence the rigidity of the rear side holding member made of resin can be further increased.

In the aforementioned display device according to the first aspect, the drawn portion formed by the first protruding portion preferably has an inclined side wall. According to this structure, unlike the case where the drawn portion has a side wall upright with respect to the substrate mounting member, the side wall of the drawn portion is inclined, so that the plane area of the drawn portion is increased when the substrate mounting member is viewed in a plane. Therefore, the rigidity of the substrate mounting member can be further increased.

The aforementioned display device according to the first aspect preferably further includes an optical member arranged on the rear side of the display cell including a liquid crystal cell, and at least a positioning portion configured to position the optical member is preferably integrally formed on the front surface of the rear side holding member made of resin, constituting the rear housing. According to this structure, the positioning portion configured to position the optical member can be integrally formed on the rear side holding member by a single resin molding process without forming a concavity and a convexity for positioning on the rear side holding member by a plurality of times of pressing to the like, unlike the case where the rear side holding member is made of sheet metal. Consequently, the positioning portion configured to position the optical member can be easily integrally formed on the rear side holding member. Furthermore, the positioning portion is integrally formed on the rear side holding member, whereby no dedicated component for positioning the optical member may be provided separately, and hence an increase in the number of components can be suppressed.

In the aforementioned display device having the positioning portion integrally formed on the rear side holding member made of resin, the optical member preferably includes a reflective sheet reflecting light from a light source to the display cell and a light guide plate arranged on a surface of the reflective sheet, guiding the light from the light source to the display cell, and the positioning portion preferably includes a positioning rib arranged to circumferentially surround the reflective sheet and the light guide plate, configured to hold the reflective sheet and the light guide plate at a prescribed position. According to this structure, the reflective sheet and the light guide plate can be easily positioned simply by arranging the reflective sheet and the light guide plate in a region (a region circumferentially surrounding the reflective sheet and the light guide plate) formed by the positioning rib.

In this case, the optical member preferably further includes an optical sheet arranged between the display cell and the light guide plate, and the positioning portion preferably includes an optical sheet positioning portion formed to protrude from the front surface of the rear side holding member toward the optical sheet to be inserted into a first hole formed in the optical sheet, configured to position the optical sheet. According to this structure, the optical sheet can be easily positioned simply by inserting the optical sheet positioning portion into the first hole of the optical sheet.

In the aforementioned display device having the positioning portion integrally formed on the rear side holding member made of resin, the display panel preferably further includes a bezel holding the display cell and the optical member from the front side and a resin frame arranged between the bezel and the rear side holding member, and a bezel fastening portion configured to fasten the bezel and the resin frame together to the rear side holding member is preferably also integrally formed on the front surface of the rear side holding member made of resin. According to this structure, in addition to the positioning portion, the bezel fastening portion can be easily integrally formed on the front surface of the rear side holding member by the single resin molding process. Furthermore, the resin frame, the display cell, and the optical member can be easily held between the bezel and the rear side holding member simply by fastening the bezel and the resin frame together to the rear side holding member by the bezel fastening portion.

In the aforementioned display device having the positioning portion integrally formed on the rear side holding member made of resin, the display panel preferably further includes a heat radiation member made of sheet metal, configured to radiate heat generated from a light source, and a heat radiation member positioning portion formed to protrude from the front surface of the rear side holding member toward the heat radiation member to be inserted into a second hole formed in the heat radiation member, configured to position the heat radiation member and a heat radiation member fastening portion configured to screw the heat radiation member to the rear side holding member are preferably also integrally formed on the front surface of the rear side holding member made of resin. According to this structure, in addition to the positioning portion, the heat radiation member positioning portion and the heat radiation member fastening portion can be easily integrally formed on the front surface of the rear side holding member by the single resin molding process. Furthermore, the heat radiation member can be easily fixed to the rear side holding member in a state where the heat radiation member is positioned simply by screwing the heat radiation member to the rear side holding member with the heat radiation member fastening portion in a state where the heat radiation member positioning portion is inserted into the second hole of the heat radiation member.

In the aforementioned display device according to the first aspect, a plurality of stiffening ribs are preferably formed on the front surface of the rear side holding member made of resin to intersect with each other in the form of a lattice.

According to this structure, the rigidity of the rear side holding member can be further increased by the plurality of stiffening ribs intersecting with each other in the form of a lattice.

A thin television set according to a second aspect of the present invention includes a display panel including a rear side holding member made of resin, holding a display cell from the rear side and a substrate mounting member made of sheet metal, mounted on the rear side holding member made of resin, mounted with a circuit substrate, while at least the rear side holding member made of resin constitutes a rear housing, the substrate mounting member made of sheet metal includes a drawn portion formed by a first protruding portion, and the rear side holding member made of resin includes a second protruding portion corresponding to the first protruding portion on a portion corresponding to the drawn portion of the substrate mounting member made of sheet metal.

As hereinabove described, the thin television set according to the second aspect of the present invention is provided with the substrate mounting member made of sheet metal, mounted on the rear side holding member made of resin, whereby the rear side holding member made of resin is reinforced by the substrate mounting member made of sheet metal, and hence a reduction in the rigidity of the rear side holding member made of resin can be suppressed. Thus, the rigidity required as the rear housing can be easily ensured even in the case where the rear side holding member made of resin constitutes the rear housing. Furthermore, the substrate mounting member made of sheet metal and the rear side holding member made of resin are provided with the first protruding portion and the second protruding portion, respectively, whereby the rigidity of the substrate mounting member made of sheet metal and the rear side holding member made of resin can be increased. In addition, the second protruding portion of the rear side holding member is formed to correspond to the first protruding portion of the substrate mounting member, whereby the rear side holding member and the substrate mounting member can be assembled in a state where the first protruding portion and the second protruding portion are in contact with each other, and hence the substrate mounting member and the rear side holding member can be tightly fixed to each other. Moreover, the rear side holding member is employed as the rear housing, whereby the number of components can be reduced, and the structure of the thin television set can be simplified, unlike the case where a rear housing covering the rear side holding member from the rear side is separately provided.

In the aforementioned thin television set according to the second aspect, the rear side holding member made of resin preferably includes a region formed by an opening or a notch, and the substrate mounting member made of sheet metal is preferably arranged in the region formed by the opening or the notch of the rear side holding member made of resin. According to this structure, the substrate mounting member made of sheet metal is arranged in the region formed by the opening or the notch of the rear side holding member, whereby the substrate mounting member made of sheet metal can be easily mounted on the rear side holding member made of resin.

In the aforementioned thin television set according to the second aspect, the drawn portion formed by the first protruding portion is preferably arranged on the outer periphery of the substrate mounting member made of sheet metal, and the second protruding portion is preferably arranged on a portion of the rear side holding member made of resin corresponding to the outer periphery of the substrate mounting member made of sheet metal. According to this structure, the second protruding portion of the rear side holding member is formed to correspond to the first protruding portion arranged on the outer periphery of the substrate mounting member, and hence the rear side holding member and the substrate mounting member can be easily assembled in the state where the first protruding portion and the second protruding portion are in contact with each other.

The aforementioned thin television set according to the second aspect preferably further includes an optical member arranged on the rear side of the display cell including a liquid crystal cell, and at least a positioning portion configured to position the optical member is preferably integrally formed on the front surface of the rear side holding member made of resin, constituting the rear housing. According to this structure, the positioning portion configured to position the optical member can be integrally formed on the rear side holding member by a single resin molding process without forming a concavity and a convexity for positioning on the rear side holding member by a plurality of times of pressing to the like, unlike the case where the rear side holding member is made of sheet metal. Consequently, the positioning portion configured to position the optical member can be easily integrally formed on the rear side holding member. Furthermore, the positioning portion is integrally formed on the rear side holding member, whereby no dedicated component for positioning the optical member may be provided separately, and hence an increase in the number of components can be suppressed.

In this case, the optical member preferably includes a reflective sheet reflecting light from a light source to the display cell and a light guide plate arranged on a surface of the reflective sheet, guiding the light from the light source to the display cell, and the positioning portion preferably includes a positioning rib arranged to circumferentially surround the reflective sheet and the light guide plate, configured to hold the reflective sheet and the light guide plate at a prescribed position. According to this structure, the reflective sheet and the light guide plate can be easily positioned simply by arranging the reflective sheet and the light guide plate in a region (a region circumferentially surrounding the reflective sheet and the light guide plate) formed by the positioning rib.

According to the present invention, as hereinabove described, a reduction in the rigidity of the rear side holding member can be suppressed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is hereinafter described with reference to the drawings.

The structure of a liquid crystal television set 100 according to the embodiment of the present invention is now described with reference to FIGS. 1 to 14. The liquid crystal television set 100 is an example of the "display device" in the present invention.

Figure 1:
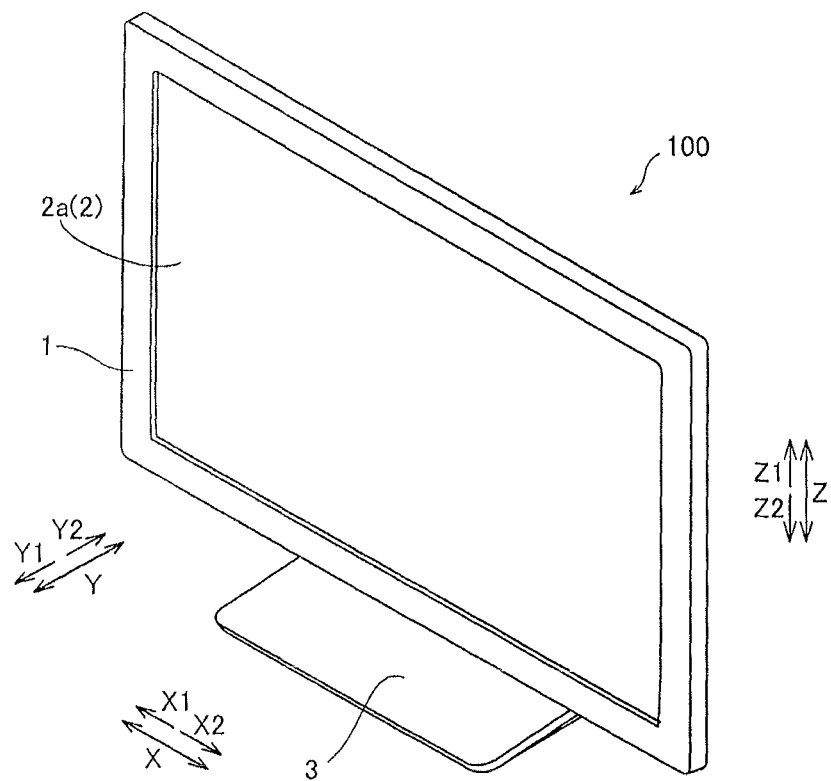
FIG. 1 is a perspective view showing the overall structure of a liquid crystal television set according to an embodiment of the present invention.
Figure 2:
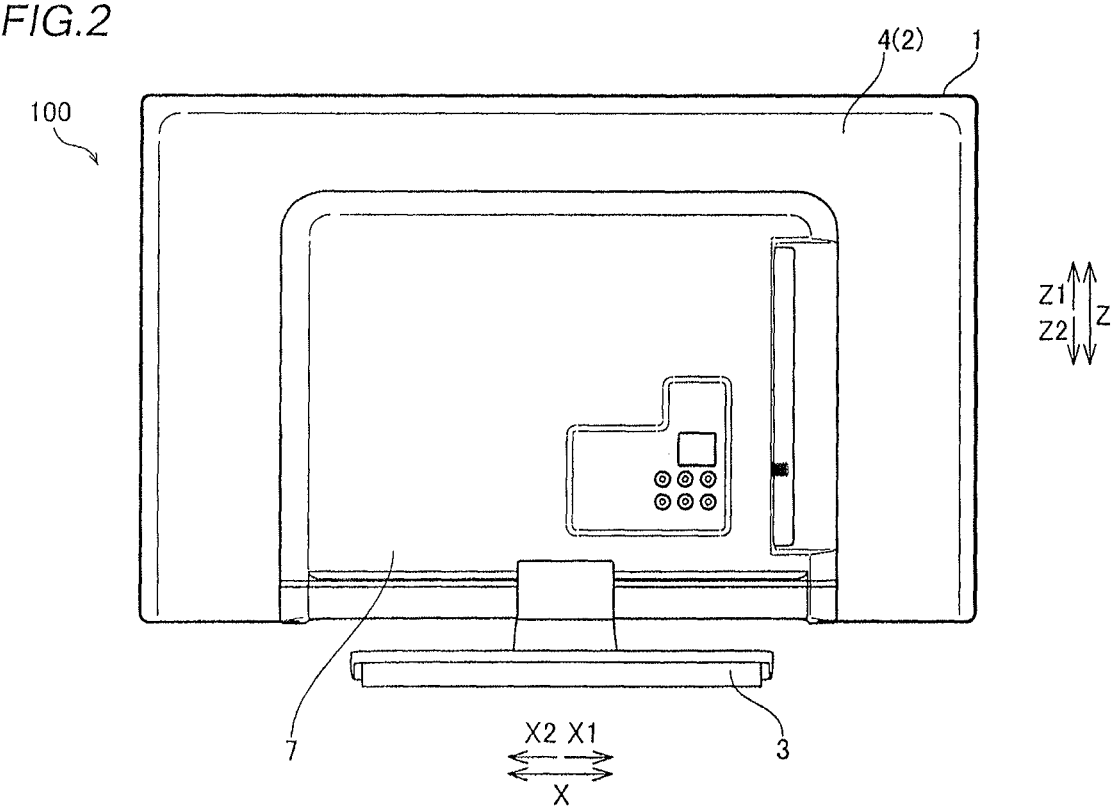
FIG. 2 is a rear view of the liquid crystal television set according to the embodiment of the present invention.

As shown in FIGS. 1 and 2, the thin liquid crystal television set 100 includes a front housing 1 having a rectangular shape as viewed from the front side (Y1 side), formed in a frame shape, a display panel 2 having a display portion 2a including a display cell (liquid crystal cell) on which a picture is displayed, and a stand member 3 supporting the liquid crystal television set 100 from below (Z2 side). The front housing 1 and the stand member 3 are made of resin.

Figure 3:
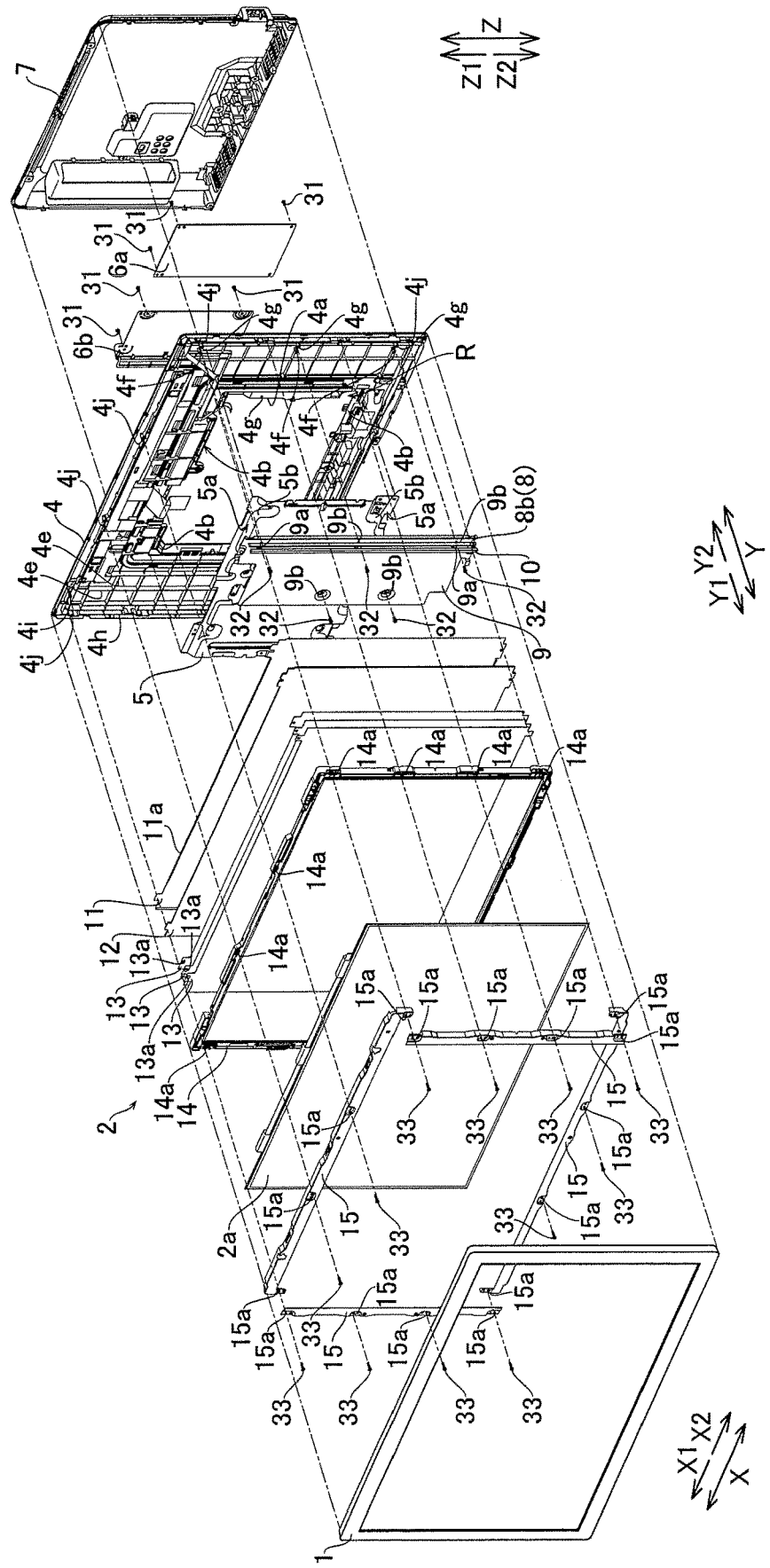
FIG. 3 is an exploded perspective view showing the liquid crystal television set according to the embodiment of the present invention as viewed from the front side.
Figure 4:
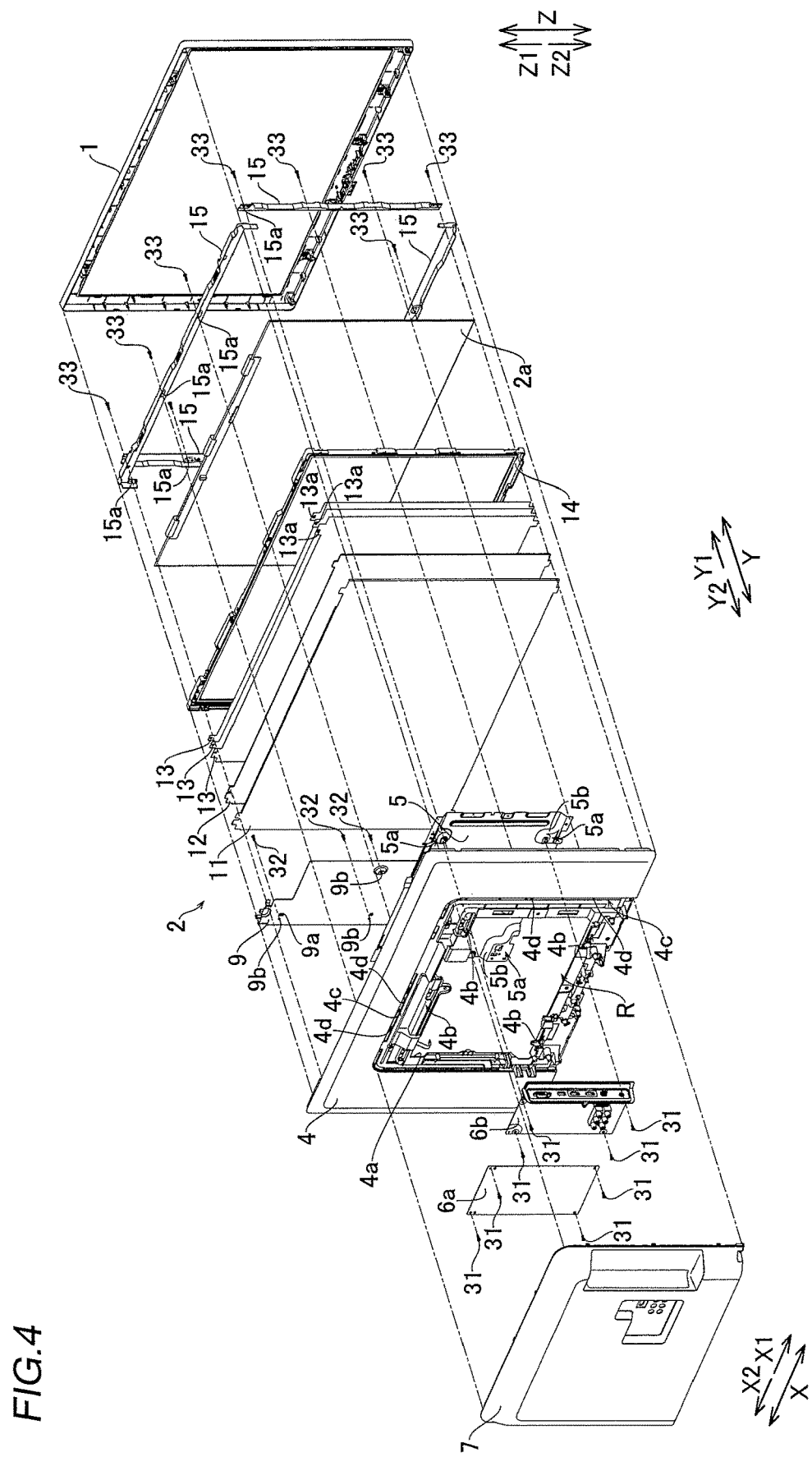
FIG. 4 is an exploded perspective view showing the liquid crystal television set according to the embodiment of the present invention as viewed from the rear side.

As shown in FIGS. 2 to 4, a rear frame 4 made of resin, holding the display portion 2a from the rear side is arranged on the rear side (Y2 side) of the front housing 1. The rear frame 4 is an example of the "rear side holding member" in the present invention. According to this embodiment, the rear frame 4 is formed in a frame shape having a rectangular outer shape corresponding to that of the front housing 1, as shown in FIGS. 3 and 4. Specifically, a rectangular opening 4a to which a substrate mounting member 5 made of sheet metal, described later is mounted is formed in the vicinity of a central portion (a portion slightly lower (Z2 side) than the central portion) of the rear frame 4.

As shown in FIGS. 3 and 4, the substrate mounting member 5 has a rectangular shape corresponding to that of the opening 4a of the rear frame 4. A rectangular power supply substrate 6a and a rectangular signal processing substrate 6b are mounted in a horizontal direction (direction X) on the rear surface (a surface on the Y2 side) of this substrate mounting member 5. The power supply substrate 6a and the signal processing substrate 6b are fixed (fastened) to the rear surface of the substrate mounting member 5 through screw members 31 to be grounded through the substrate mounting member 5. The power supply substrate 6a and the signal processing substrate 6b are examples of the "circuit substrate" in the present invention.

Figure 6:
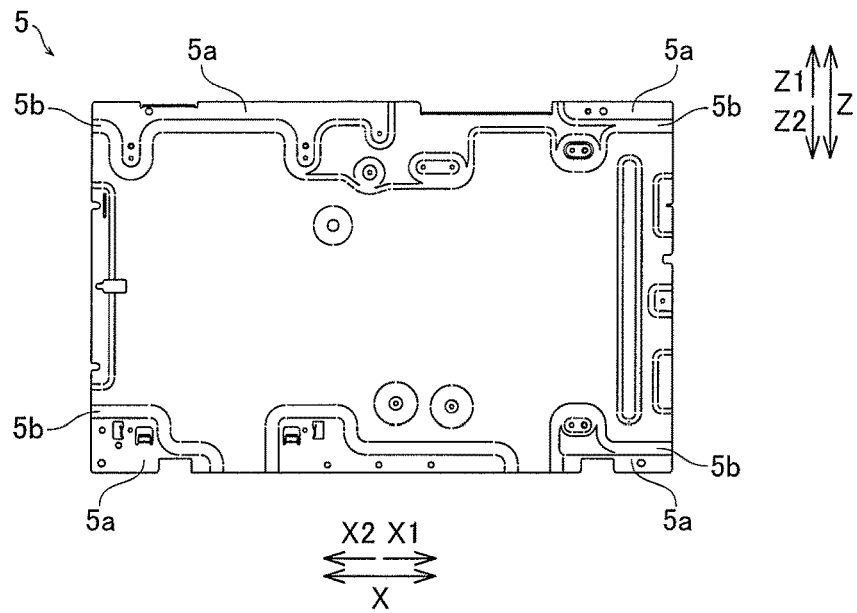
FIG. 6 is a rear view of a substrate mounting member of the liquid crystal television set according to the embodiment of the present invention.
Figure 7:
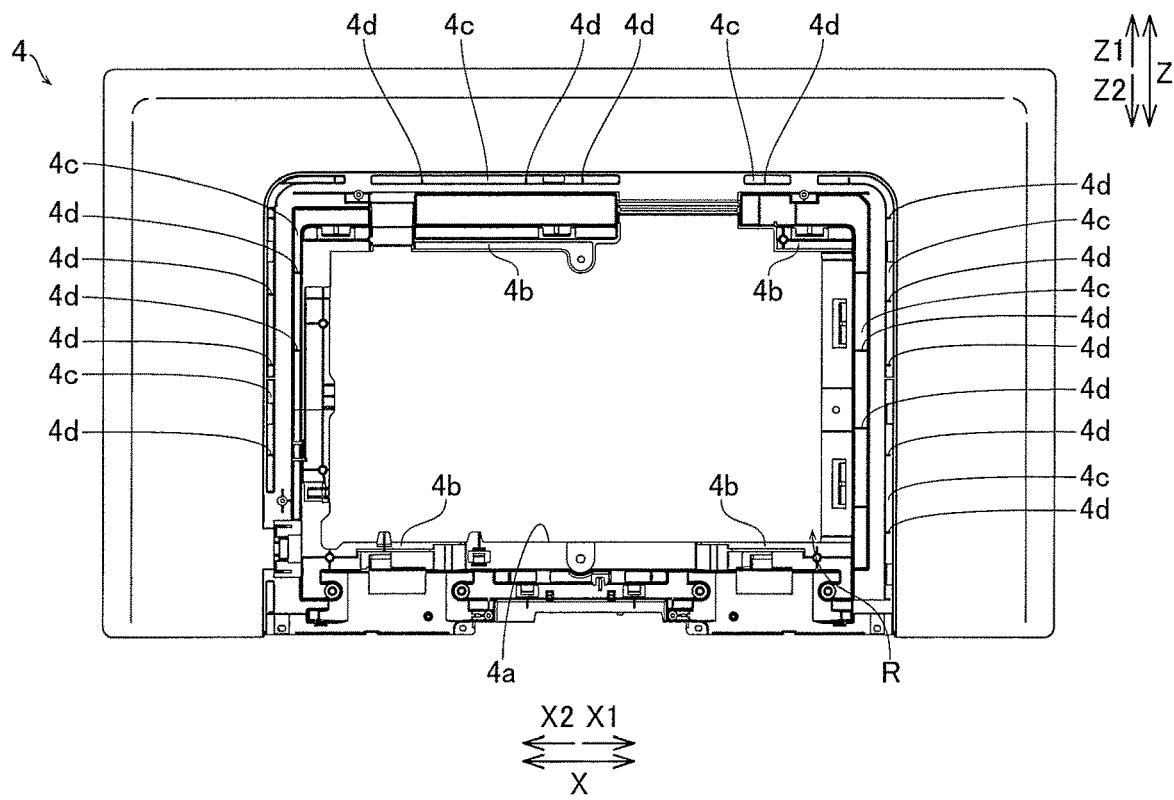
FIG. 7 is a rear view of a rear frame of the liquid crystal television set according to the embodiment of the present invention.

According to this embodiment, drawn portions 5a each formed by a protruding portion protruding toward the rear frame 4 (Y2 side) are formed on the outer periphery (portions in the vicinity of a pair of end sides extending in the horizontal direction (direction X) on both sides in a vertical direction (direction Z)) of the substrate mounting member 5, as shown in FIGS. 3, 4, and 6. These drawn portions 5a each have a tapered (inclined) side wall 5b. As shown in FIGS. 3, 4, and 7, protruding portions 4b protruding toward a cover member 7 (Y2 side) are formed on portions (portions in the vicinity of the pair of end sides extending in the horizontal direction on both sides in the vertical direction in a rectangular region R formed by the opening 4a) of the rear frame 4 corresponding to the outer periphery formed with the drawn portions 5a of the substrate mounting member 5. The drawn portions 5a and the protruding portions 4b are examples of the "first protruding portion" and the "second protruding portion" in the present invention, respectively.

As shown in FIGS. 3 and 4, the drawn portions 5a of the substrate mounting member 5 and the protruding portions 4b of the rear frame 4 are configured to correspond to each other. In other words, portions on the rear side (Y2 side) of the drawn portions 5a of the substrate mounting member 5 and portions on the front side (Y1 side) of the protruding portions 4b of the rear frame 4 are configured to come into contact with each other in a state where the substrate mounting member 5 is mounted on the region R formed by the opening 4a of the rear frame 4. Thus, the substrate mounting member 5 is mounted on the rear frame 4 to close the opening 4a of the rear frame 4 from the front side (Y1 side).

Figure 8:
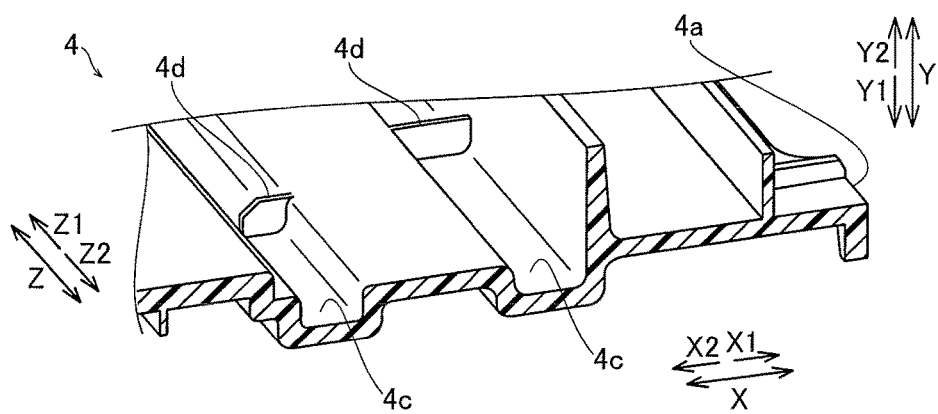
FIG. 8 is an enlarged perspective view of a stiffening rib formed inside a groove-like recess portion of the rear frame of the liquid crystal television set according to the embodiment of the present invention.

According to this embodiment, a plurality of groove-like recess portions 4c are formed on portions (portions closer to the outer periphery beyond the protruding portions 4b) of the rear surface (a surface on the Y2 side) of the rear frame 4 other than portions formed with the protruding portions 4b, as shown in FIGS. 4, 7, and 8. Stiffening ribs 4d extending in a direction intersecting with the groove-like recess portions 4c are formed inside the groove-like recess portions 4c. FIG. 8 is an enlarged perspective view showing the recess portions 4c and the stiffening ribs 4d formed outside (X2 side) the vicinity of a central portion in the vertical direction (direction Z) of the left (X2 side) end side of the rectangular region R of the rear frame 4 shown in FIG. 7.

Figure 5:
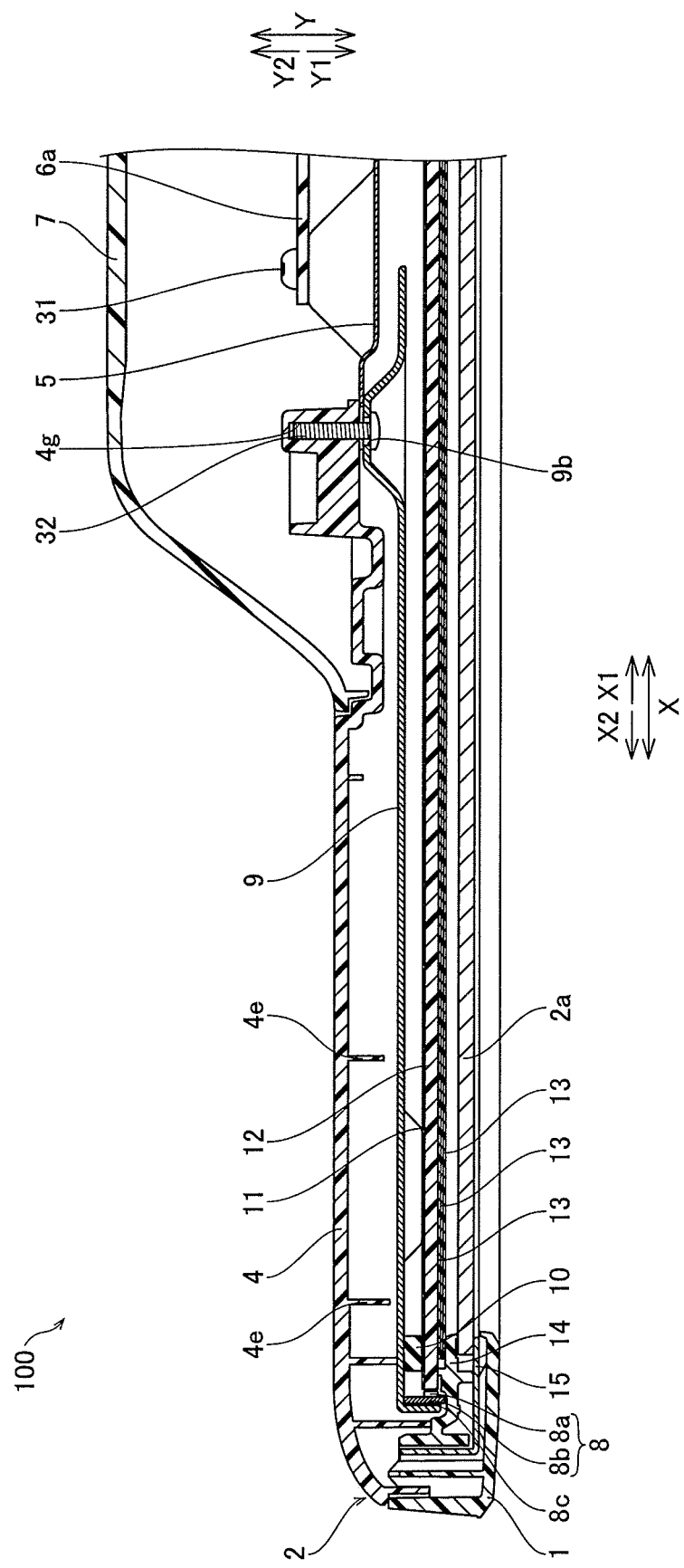
FIG. 5 is a schematic sectional view of the liquid crystal television set according to the embodiment of the present invention taken horizontally.
Figure 9:
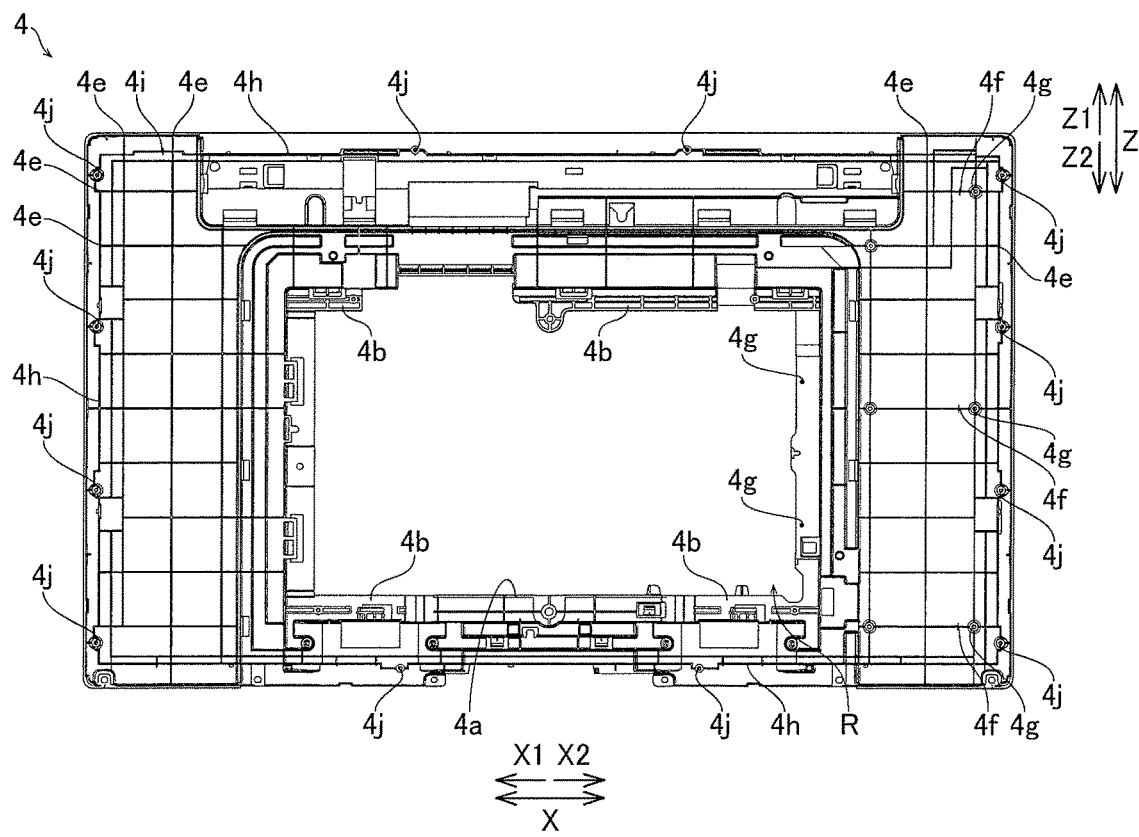
FIG. 9 is a front view of the rear frame of the liquid crystal television set according to the embodiment of the present invention.

According to this embodiment, a plurality of stiffening ribs 4e are formed also on the front surface (a surface on the Y1 side) of the rear frame 4 to increase the rigidity of the rear frame 4, as shown in FIGS. 3, 5, and 9. The plurality of stiffening ribs 4e are arranged on the front surface of the rear frame 4 to intersect with each other in the form of a lattice, as shown in FIG. 9.

As shown in FIGS. 3 and 4, the cover member 7 made of resin is mounted on the rectangular region R formed by the opening 4a in the vicinity of a central portion of the rear frame 4 from the rear side (Y2 side). This cover member 7 has a rectangular shape smaller than that of the rear frame 4. Thus, the cover member 7 is configured to cover the substrate mounting member 5 from the rear side in a state where the rear surface of the rear frame 4 is exposed. According to this embodiment, the rear frame 4 and the cover member 7 constitute a rear housing corresponding to the front housing 1. The front housing 1 is fixed to the rear frame 4 by screw members (not shown).

As shown in FIGS. 3 to 5 and 10, a heat sink 9 made of sheet metal mounted with a light source portion 8, described later, including a plurality of LEDs (light emitting diodes) 8a is arranged on the front surface (the surface on the Y1 side) of the rear frame 4. This heat sink 9 is formed to extend in the horizontal direction (direction X) from the side of the light source portion 8 to the side of the substrate mounting member 5 and extend in the vertical direction (direction Z) along an end side of the opening 4a of the rear frame 4 closer to the heat sink 9 (X2 side). An elastic supporting member 11 configured to support a reflective sheet 10 described later from the rear side is arranged on the front surface of the heat sink 9. The LEDs 8a are examples of the "light source" in the present invention, and the heat sink 9 is an example of the "heat radiation member" in the present invention.

Figure 10:
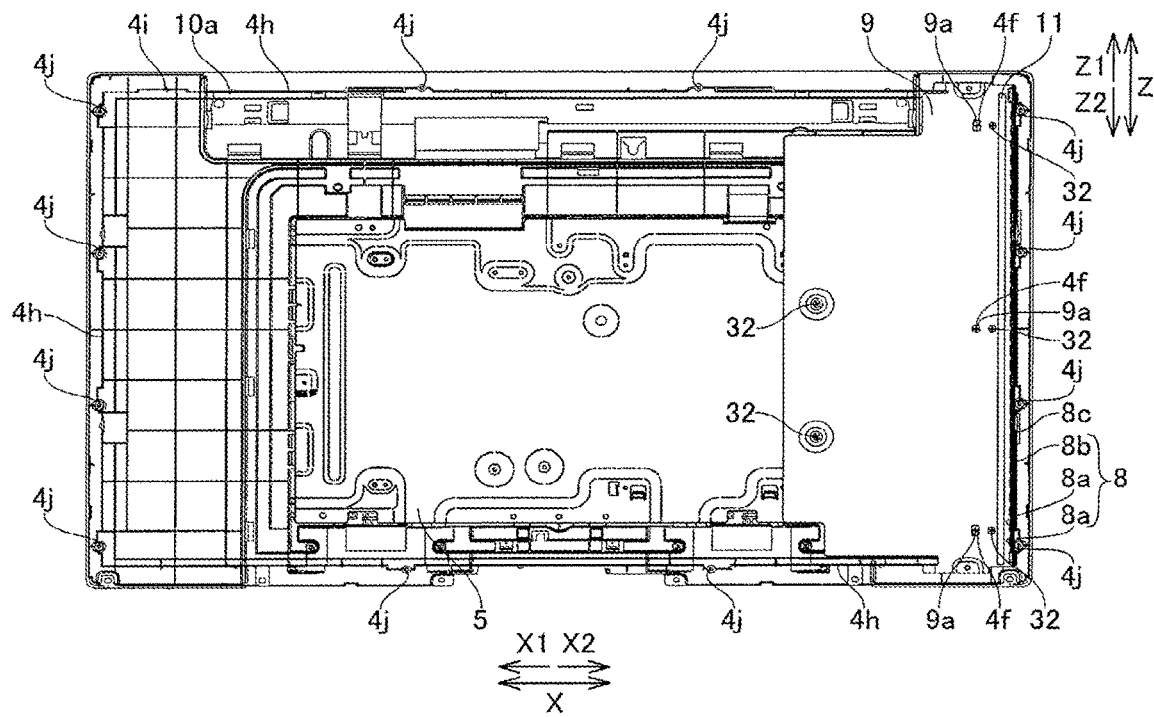
FIG. 10 is a front view showing a state where a heat sink is mounted on the front surface of the rear frame of the liquid crystal television set according to the embodiment of the present invention.

According to this embodiment, the heat sink 9 is fixed (screwed) to the rear frame 4 by a plurality of (five) screw members 32, as shown in FIGS. 3, 4, and 10. Specifically, heat sink positioning portions 4f configured to position the heat sink 9 with respect to the rear frame 4 and heat sink screwing portions 4g configured to screw the heat sink 9 to the rear frame 4 are integrally formed on the front surface (the surface on the Y1 side) of the rear frame 4, as shown in FIG. 9. The heat sink positioning portions 4f and the heat sink screwing portions 4g are examples of the "heat radiation member positioning portion" and the "heat radiation member fastening portion" in the present invention, respectively.

As shown in FIGS. 3 and 10, the heat sink positioning portions 4f protrude from the front surface of the rear frame 4 toward the heat sink 9 (Y1 side) to be inserted into rectangular positioning holes 9a formed in the heat sink 9. These heat sink positioning portions 4f each are configured to extend from the front surface of the rear frame 4 toward the heat sink 9 in a state where two narrow ribs crisscross, like an optical sheet positioning portion 4i (see FIG. 13) described later. The three heat sink positioning portions 4f are provided at intervals in the vertical direction (direction Z) in the vicinity of an end of the heat sink 9 closer the light source portion 8 (X2 side). The positioning holes 9a are examples of the "second holes" in the present invention.

As shown in FIGS. 3 and 9, the heat sink screwing portions 4g are formed by screw holes corresponding to screw insertion holes 9b (see FIGS. 3 and 4) formed in the heat sink 9. Three of these heat sink screwing portions 4g are arranged in the vicinity of the aforementioned heat sink positioning portions 4f of the heat sink 9, and two of these heat sink screwing portions 4g are arranged in the vicinity of a central portion of an end of the heat sink 9 opposite (X1 side) to the light source portion 8. As shown in FIGS. 3 and 10, each of the screw members 32 inserted into the screw insertion holes 9b of the heat sink 9 engages with each of the heat sink screwing portions 4g (five in total).

As shown in FIGS. 3 to 5, the reflective sheet 10 reflecting light from the LEDs 8a to the display portion 2a, a light guide plate 12 guiding light from the LEDs 8a to the display portion 2a, a plurality of (three) optical sheets 13 including a light diffusion sheet, a lens sheet, etc., a rectangular resin frame 14 formed in a frame shape, the display portion 2a having a rectangular shape, and four bezels 15 extending along the four sides of the display portion 2a having the rectangular shape are arranged on the front side (Y1 side) of the heat sink 9 and the rear side (Y2 side) of the front housing 1. The reflective sheet 10, the light guide plate 12, and the optical sheets 13 are examples of the "optical member" in the present invention.

As shown in FIGS. 3, 5, and 10, the light source portion 8 includes the LEDs 8a emitting light and an LED substrate 8b mounted with the LEDs 8a. This light source portion 8 is arranged on the side of the heat sink 9 opposite (X2 side) to the substrate mounting member 5. Specifically, the light source portion 8 is arranged along an end side (a side extending in the direction Z of an end on the X2 side) of the rectangular rear frame 4 extending in the vertical direction. In other words, the liquid crystal television set 100 according to this embodiment is a side edge light type display device having the light source portion 8 arranged on the side.

As shown in FIG. 10, the plurality of LEDs 8a are mounted at intervals along an extensional direction (direction Z) of the LED substrate 8b on a surface of the LED substrate 8b closer to the light guide plate 12 (X1 side). Thus, the plurality of LEDs 8a are configured to emit light to an end surface of the rectangular light guide plate 12 closer to the heat sink 9 (X2 side), as shown in FIG. 5. As shown in FIGS. 5 and 10, the back surface of the LED substrate 8b opposite (X2 side) to the LEDs 8a is mounted on the heat sink 9 through a heat radiation tape 8c. Thus, the heat sink 9 is arranged in contact with the light source portion 8 (the LEDs 8a and the LED substrate 8b) through the heat radiation tape 8c. The LEDs 8a are configured to generate heat in the normal use of the liquid crystal television set 100 (in a state where the LEDs 8a emit light to the light guide plate 12 to display a picture on the display portion 2a).

According to this embodiment, the four bezels 15 are fixed to the front surface (the surface on the Y1 side) of the rear frame 4 by a plurality of (twelve) screw members 33, as shown in FIGS. 3 and 4. Thus, the heat sink 9 mounted with the light source portion 8, the reflective sheet 10, the light guide plate 12, the three optical sheets 13, the resin frame 14, and the display portion 2a are held between the four bezels 15 and the rear frame 4. Consequently, according to this embodiment, the display panel 2 as one module is constituted by the heat sink 9 mounted with the light source portion 8, the reflective sheet 10, the light guide plate 12, the three optical sheets 13, the resin frame 14, the display portion 2a, the four bezels 15, and the rear frame 4.

Figure 11:
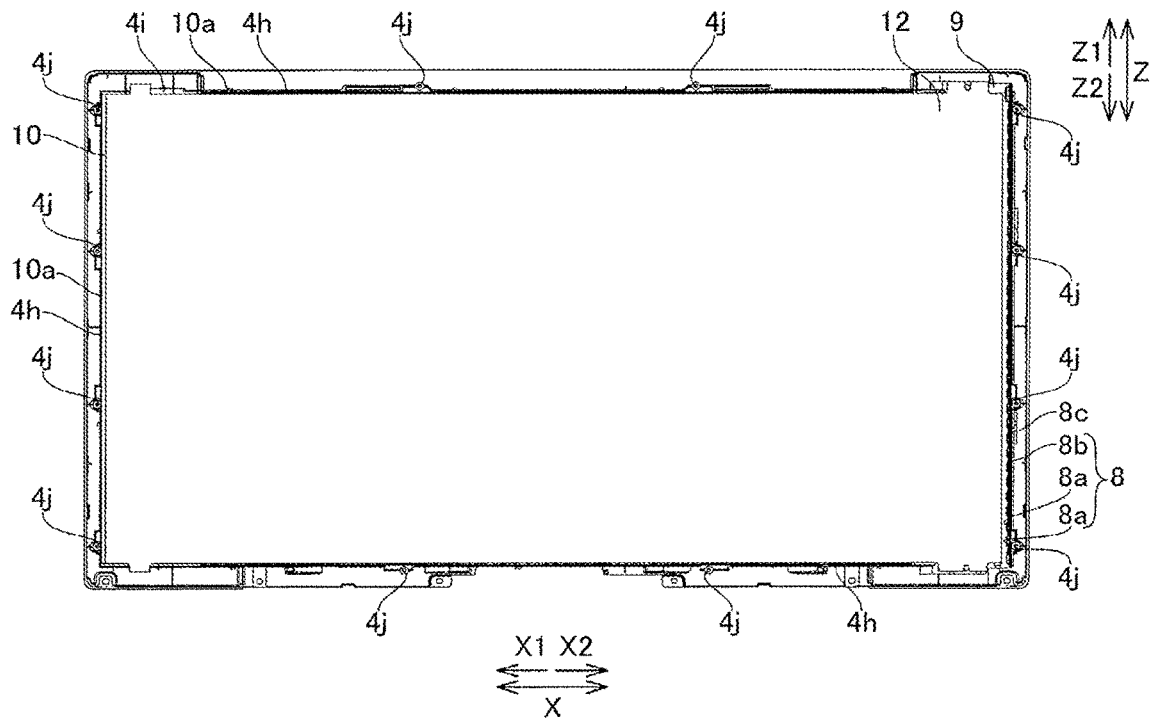
FIG. 11 is a front view showing a state where the heat sink, a reflective sheet, and a light guide plate are arranged on the front surface of the rear frame of the liquid crystal television set according to the embodiment of the present invention.
Figure 12:
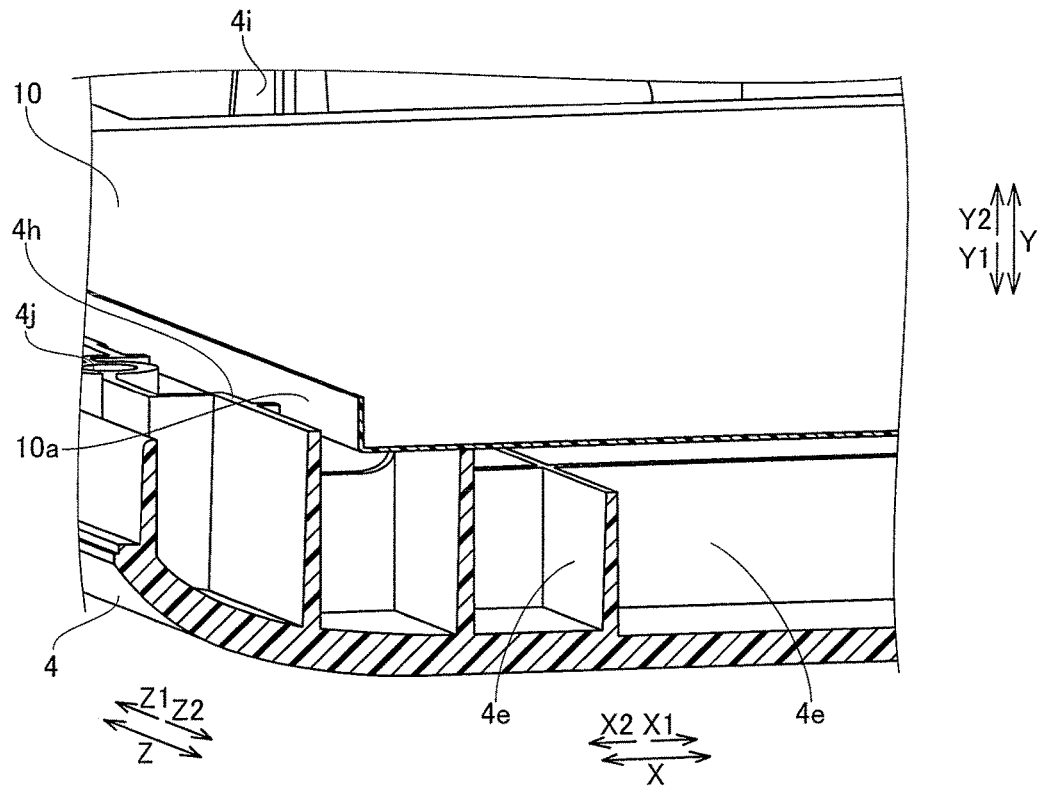
FIG. 12 is an enlarged perspective view of a positioning rib of the rear frame of the liquid crystal television set according to the embodiment of the present invention.

Specifically, a positioning rib 4h configured to hold the reflective sheet 10 and the light guide plate 12 arranged on a surface (a surface on the Y1 side) of the reflective sheet 10 is integrally formed on the front surface (the surface on the Y1 side) of the rear frame 4, as shown in FIGS. 3 and 12. This positioning rib 4h is arranged to circumferentially surround the outer periphery (three end sides other than an end side closer to the heat sink 9 (X2 side)) of the reflective sheet 10 having a rectangular outer shape and the outer periphery of the light guide plate 12 having a rectangular outer shape, as shown in FIGS. 9 to 11. The positioning rib 4h is an example of the "positioning portion" in the present invention.

As shown in FIGS. 11 and 12, the reflective sheet 10 has a fold-back portion 10a formed by folding the vicinity of the outer periphery (the vicinities of the three end sides other than the end side closer to the heat sink 9) of the reflective sheet 10 forward (Y1 side). This fold-back portion 10*a* has a function of suppressing leakage of light from the outer peripheral surface of the light guide plate 12 (see FIG. 11) arranged on the surface (the surface on the Y1 side) of the reflective sheet 10.

As shown in FIG. 12, the aforementioned positioning rib 4*h* integrally formed on the front surface (the surface on the Y1 side) of the rear frame 4 is configured to suppress the fold-back portion 10*a* in the vicinity of the outer periphery of the reflective sheet 10 from falling outward (to the X2 side in FIG. 12). Thus, the reflective sheet 10 and the light guide plate 12 are positioned at a prescribed position (a rectangular region surrounded by the positioning rib 4*h*) of the front surface of the rear frame 4, as shown in FIG. 11. FIG. 12 is an enlarged view showing the positioning rib 4*h* formed in the vicinity of a central portion in the vertical direction (direction Z) of the left (X1 side) end in FIG. 11 and the reflective sheet 10. In FIG. 12, illustration of the light guide plate 12 is omitted unlike in FIG. 11.

Figure 13:
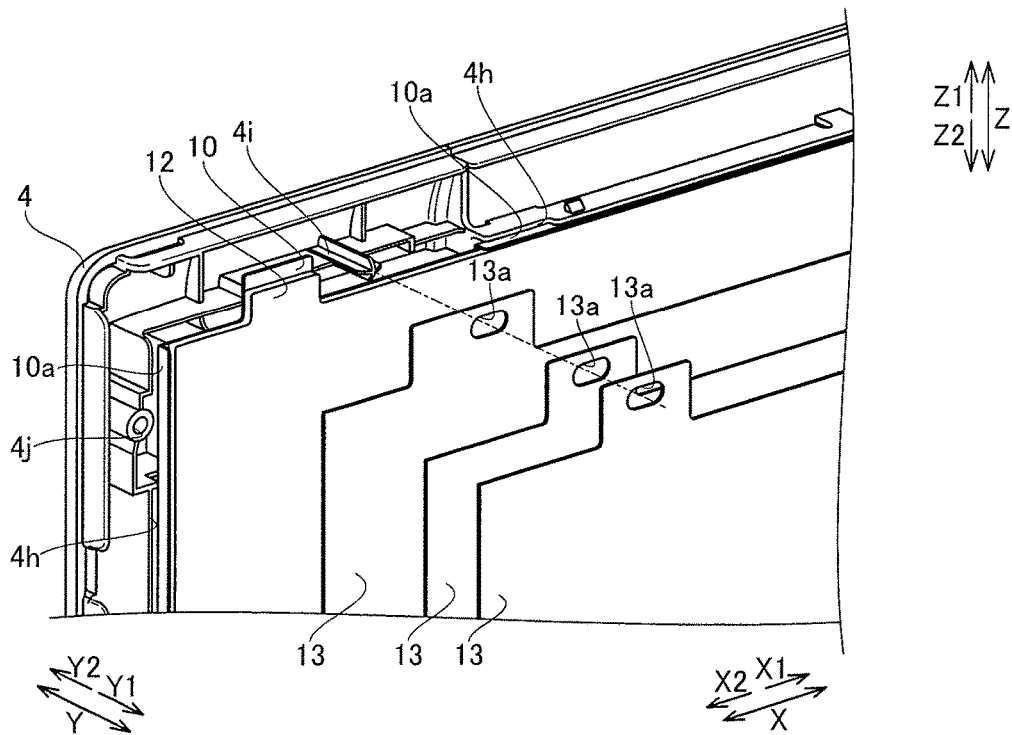
FIG. 13 is an enlarged perspective view of an optical sheet positioning portion of the rear frame of the liquid crystal television set according to the embodiment of the present invention.

As shown in FIGS. 3 and 13, the optical sheet positioning portion 4*i* configured to position the three optical sheets 13 is integrally formed on the front surface (the surface on the Y1 side) of the rear frame 4. This optical sheet positioning portion 4*i* protrudes from the front surface of the rear frame 4 toward the optical sheets 13 (Y1 side) to be inserted into oval positioning holes 13*a* formed in corners (corners on the X1 side and the Z1 side) of the three optical sheets 13. The optical sheet positioning portion 4*i* is configured to extend from the front surface of the rear frame 4 toward the optical sheets 13 in a state where two narrow ribs crisscross. The positioning holes 13*a* are examples of the "first hole" in the present invention, and the optical sheet positioning portion 4*i* is an example of the "positioning portion" in the present invention.

Figure 14:
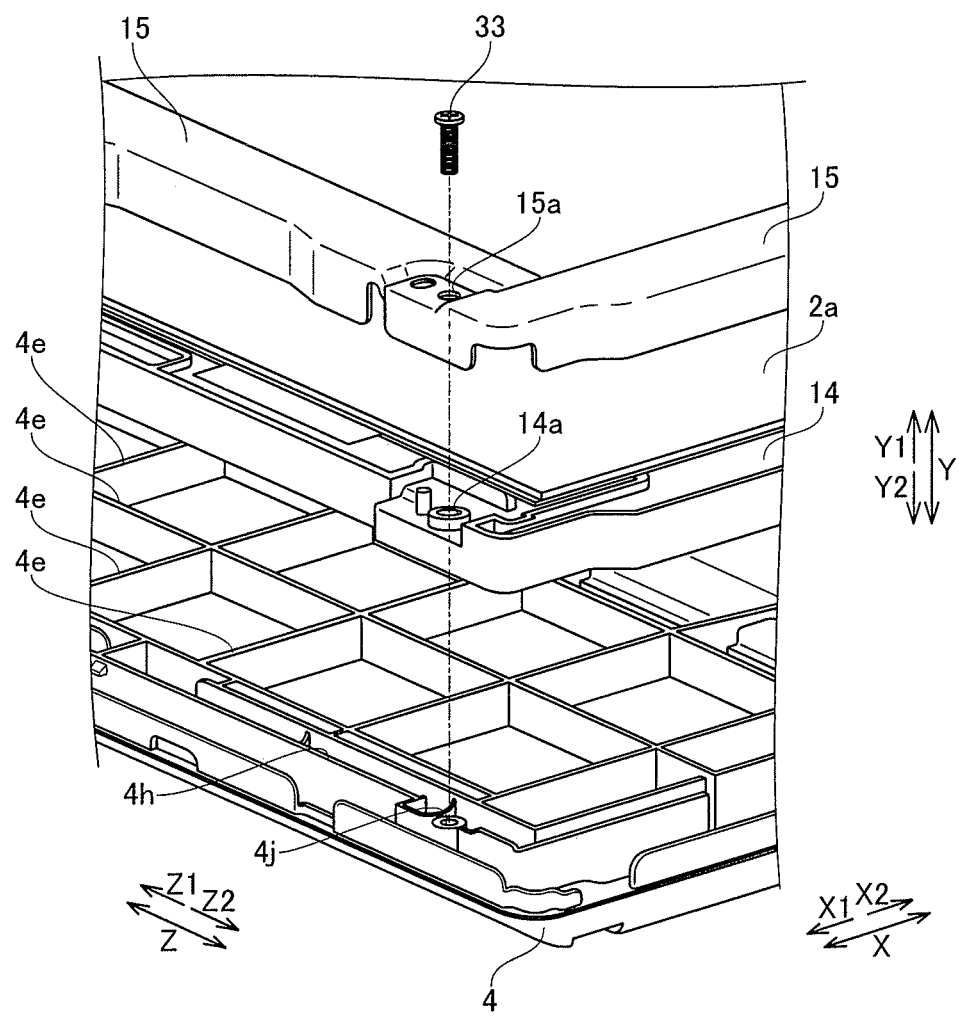
FIG. 14 is an enlarged exploded perspective view showing a bezel fastening portion of the rear frame of the liquid crystal television set according to the embodiment of the present invention.

As shown in FIGS. 3 and 14, a plurality of bezel screwing portions 4*j* configured to fasten the four bezels 15 and the resin frame 14 together to the rear frame 4 are integrally formed on the front surface (the surface on the Y1 side) of the rear frame 4. These bezel screwing portions 4*j* are formed by screw holes corresponding to screw insertion holes 15*a* formed in the bezels 15 and screw insertion holes 14*a* formed in the resin frame 14. The bezel screwing portions 4*j* are examples of the "bezel fastening portion" in the present invention.

As shown in FIGS. 9 to 11, the plurality of (twelve) bezel screwing portions 4*j* are formed at intervals along the rectangular periphery of the rear frame 4. As shown in FIGS. 3 and 14, each of the screw members 33 inserted into the screw insertion holes 15*a* of the bezels 15 and the screw insertion holes 14*a* of the resin frame 14 engages with each of the plurality of bezel screwing portions 4*j*. FIG. 14 is an enlarged view showing a bezel screwing portion 4*j* of the rear frame 4, a screw insertion hole 15*a* of the bezel 15, and a screw insertion hole 14*a* of the resin frame 14 in the corner on the rear side (X1 side) and the lower side (Z2 side) of the plane of FIG. 3. In FIG. 14, illustration of the reflective sheet 10, the light guide plate 12, and the plurality of optical sheets 13 all arranged on the front surface (the surface on the Y1 side) of the rear frame 4 is omitted.

According to this embodiment, as hereinabove described, the liquid crystal television set 100 is provided with the substrate mounting member 5 made of sheet metal mounted on the rear frame 4 made of resin, whereby the rear frame 4 made of resin is reinforced by the substrate mounting member 5 made of sheet metal, and hence a reduction in the rigidity of the rear frame 4 made of resin can be suppressed. Thus, the rigidity required as the rear housing can be easily ensured even in the case where the rear frame 4 made of resin constitutes the rear housing. Furthermore, the substrate mounting member 5 and the rear frame 4 are provided with the drawn portions 5*a* and the protruding portions 4*b*, respectively, whereby the rigidity of the substrate mounting member 5 and the rear frame 4 can be increased. In addition, the protruding portions 4*b* of the rear frame 4 are formed to correspond to the drawn portions 5*a* of the substrate mounting member 5, whereby the rear frame 4 and the substrate mounting member 5 can be assembled in a state where the drawn portions 5*a* and the protruding portions 4*b* are in contact with each other, and hence the substrate mounting member 5 and the rear frame 4 can be tightly fixed to each other. Moreover, the rear frame 4 is employed as the rear housing, whereby the number of components can be reduced, and the structure of the liquid crystal television set 100 can be simplified, unlike the case where a rear housing covering the rear frame 4 from the rear side is separately provided.

According to this embodiment, as hereinabove described, the rear frame 4 made of resin is provided with the region R formed by the opening 4*a*, and the substrate mounting member 5 made of sheet metal is arranged in the region R formed by the opening 4*a* of the rear frame 4 made of resin. Thus, the substrate mounting member 5 made of sheet metal is arranged in the region R formed by the opening 4*a* of the rear frame 4, whereby the substrate mounting member 5 made of sheet metal can be easily mounted on the rear frame 4 made of resin.

According to this embodiment, as hereinabove described, the drawn portions 5*a* are arranged on the outer periphery of the substrate mounting member 5 made of sheet metal, and the protruding portions 4*b* are arranged on a portion of the rear frame 4 made of resin corresponding to the outer periphery of the substrate mounting member 5 made of sheet metal. Thus, the protruding portions 4*b* of the rear frame 4 are formed to correspond to the drawn portions 5*a* arranged on the outer periphery of the substrate mounting member 5, and hence the rear frame 4 and the substrate mounting member 5 can be easily assembled in the state where the drawn portions 5*a* and the protruding portions 4*b* are in contact with each other.

According to this embodiment, as hereinabove described, the cover member 7 made of resin covering the substrate mounting member 5 from the rear side (Y2 side) in the state where the rear surface of the rear frame 4 is exposed is arranged in the region R formed by the opening 4*a* of the rear frame 4, and the rear frame 4 made of resin and the cover member 7 made of resin constitute the rear housing. Thus, the rigidity of the rear housing can be further increased by the cover member 7 made of resin, unlike the case where only the rear frame 4 made of resin constitutes the rear housing.

According to this embodiment, as hereinabove described, the rear frame 4 made of resin has the region R formed by the opening 4*a* having a rectangular shape, and the substrate mounting member 5 made of sheet metal has the rectangular shape, is mounted with the power supply substrate 6*a* and the signal processing substrate 6*b* each having a rectangular shape, and is arranged in the region R formed by the opening having the rectangular shape of the rear frame 4 made of resin. Thus, unlike the case where the region R is formed by a notch, the region R is formed by the opening 4*a* having the rectangular shape, so that the high rigidity of the rear frame 4 can be maintained. Furthermore, the substrate mounting member 5 made of sheet metal, having the rectangular shape is arranged in the region R formed by the opening 4a having the rectangular shape of the rear frame 4 made of resin, whereby the power supply substrate 6a and the signal processing substrate 6b each having the rectangular shape can be easily mounted on the substrate mounting member 5.

According to this embodiment, as hereinabove described, the power supply substrate 6a and the signal processing substrate 6b are grounded through the substrate mounting member 5 made of sheet metal. Thus, the power supply substrate 6a and the signal processing substrate 6b can be easily grounded simply by mounting the power supply substrate 6a and the signal processing substrate 6b on the substrate mounting member 5 made of sheet metal, configured to reinforce the rear frame 4 made of resin.

According to this embodiment, as hereinabove described, the groove-like recess portions 4c are formed on the portions (the portions closer to the outer periphery beyond the protruding portions 4b) of the rear frame 4 other than the portions formed with the protruding portions 4b. Thus, the rigidity of the rear frame 4 made of resin can be further increased by the groove-like recess portions 4c.

According to this embodiment, as hereinabove described, the stiffening ribs 4d extending in the direction intersecting with the groove-like recess portions 4c are formed inside the groove-like recess portions 4c. Thus, the rigidity of the groove-like recess portions 4c can be increased by the stiffening ribs 4d, and hence the rigidity of the rear frame 4 made of resin can be further increased.

According to this embodiment, as hereinabove described, the drawn portions 5a each are formed to have the tapered (inclined) side wall 5b. Thus, unlike the case where the drawn portions 5a each have a side wall upright with respect to the substrate mounting member 5, the side wall 5b of each of the drawn portions 5a is tapered (inclined), so that the plane area of the drawn portions 5a is increased when the substrate mounting member 5 is viewed in a plane (viewed along arrow Y2). Therefore, the rigidity of the substrate mounting member 5 can be further increased.

According to this embodiment, as hereinabove described, the positioning rib 4h configured to position the reflective sheet 10 and the light guide plate 12 and the optical sheet positioning portion 4i configured to position the optical sheets 13 are integrally formed on the front surface (the surface on the Y1 side) of the rear frame 4 made of resin, constituting the rear housing. Thus, the positioning rib 4h configured to position the reflective sheet 10 and the light guide plate 12 and the optical sheet positioning portion 4i configured to position the optical sheets 13 can be integrally formed on the front surface (the surface on the Y1 side) of the rear frame 4 by a single resin molding process without forming a concavity and a convexity for positioning on the rear frame 4 by a plurality of times of pressing to the like, unlike the case where the rear frame 4 is made of sheet metal. Consequently, the positioning rib 4h configured to position the reflective sheet 10 and the light guide plate 12 and the optical sheet positioning portion 4i configured to position the optical sheets 13 can be easily integrally formed on the rear frame 4. Furthermore, the positioning rib 4h and the optical sheet positioning portion 4i are integrally formed on the rear frame 4, whereby no dedicated component for positioning the reflective sheet 10, the light guide plate 12, and the optical sheets 13 may be provided separately, and hence an increase in the number of components can be suppressed.

According to this embodiment, as hereinabove described, the positioning rib 4h configured to hold (position) the reflective sheet 10 and the light guide plate 12 at the prescribed position is arranged to circumferentially surround the reflective sheet 10 and the light guide plate 12. Thus, the positioning rib 4h arranged to circumferentially surround the reflective sheet 10 and the light guide plate 12 is provided, whereby the reflective sheet 10 and the light guide plate 12 can be easily positioned simply by arranging the reflective sheet 10 and the light guide plate 12 in a region (a rectangular region circumferentially surrounding the reflective sheet 10 and the light guide plate 12) formed by the positioning rib 4h.

According to this embodiment, as hereinabove described, the optical sheet positioning portion 4i configured to position the optical sheets 13 is formed to protrude from the front surface (the surface on the Y1 side) of the rear frame 4 toward the optical sheets 13 (Y1 side) to be inserted into the positioning holes 13a formed in the optical sheets 13. Thus, the optical sheets 13 can be easily positioned simply by inserting the optical sheet positioning portion 4i into the positioning holes 13a of the optical sheets 13.

According to this embodiment, as hereinabove described, the bezel screwing portions 4j configured to fasten the bezels 15 and the resin frame 14 together to the rear frame 4 are also integrally formed on the front surface (the surface on the Y1 side) of the rear frame 4 made of resin. Thus, in addition to the positioning rib 4h and the optical sheet positioning portion 4i, the bezel screwing portions 4j can be easily integrally formed on the front surface of the rear frame 4 by the single resin molding process. Furthermore, the resin frame 14, the display portion 2a, the reflective sheet 10, the light guide plate 12, and the optical sheets 13 can be easily held between the bezels 15 and the rear frame 4 simply by fastening the bezels 15 and the resin frame 14 together to the rear frame 4 by the bezel screwing portions 4j.

According to this embodiment, as hereinabove described, the heat sink positioning portions 4f configured to position the heat sink 9 and the heat sink screwing portions 4g configured to screw the heat sink 9 to the rear frame 4 are also integrally formed on the front surface (the surface on the Y1 side) of the rear frame 4 made of resin, and the heat sink positioning portions 4f are formed to protrude from the front surface of the rear frame 4 toward the heat sink 9 (Y1 side) to be inserted into the positioning holes 9a formed in the heat sink 9. Thus, in addition to the positioning rib 4h and the optical sheet positioning portion 4i, the heat sink positioning portions 4f and the heat sink screwing portions 4g can be easily integrally formed on the front surface of the rear frame 4 by the single resin molding process. Furthermore, the heat sink 9 can be easily fixed to the rear frame 4 in a state where the heat sink 9 is positioned simply by screwing the heat sink 9 to the rear frame 4 with the heat sink screwing portions 4g in a state where the heat sink positioning portions 4f are inserted into the positioning holes 9a of the heat sink 9.

According to this embodiment, as hereinabove described, the plurality of stiffening ribs are formed on the front surface of the rear frame 4 made of resin to intersect with each other in the form of a lattice. According to this structure, the rigidity of the rear frame 4 can be further increased by the plurality of stiffening ribs intersecting with each other in the form of a lattice.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the present invention is applied to the thin liquid crystal television set as the example of the display device in the aforementioned embodiment, the present invention is applicable to a common display device such as a display for a PC (personal computer) other than the liquid crystal television set.

While the present invention is applied to the side edge light type liquid crystal television set having the light source portion arranged on the side in the aforementioned embodiment, the present invention is also applicable to a back light type liquid crystal television set having a light source portion arranged on the back side.

While the reflective sheet and the light guide plate are positioned by arranging the reflective sheet and the light guide plate in the region surrounded by the positioning rib in the aforementioned embodiment, the present invention is not restricted to this. According to the present invention, the reflective sheet and the light guide plate may alternatively be positioned by positioning ribs formed only at positions corresponding to the four corners of the reflective sheet and the light guide plate. Alternatively, a positioning structure other than the rib may be employed so far as the reflective sheet and the light guide plate can be positioned.

While the optical sheets are positioned by inserting the optical sheet positioning portion protruding and extending from the front surface of the rear frame toward the optical sheets in the state where the two narrow ribs crisscross into the optical sheet positioning holes in the aforementioned embodiment, the present invention is not restricted to this. According to the present invention, the optical sheets may alternatively be positioned by a columnar optical sheet positioning portion. Alternatively, a positioning structure other than the structure of inserting the positioning portion into the positioning holes may be employed so far as the optical sheets can be positioned.

Similarly, while the heat sink is positioned by inserting the heat sink positioning portions protruding and extending from the front surface of the rear frame toward the heat sink in the state where the two narrow ribs crisscross into the positioning holes of the heat sink in the aforementioned embodiment, the present invention is not restricted to this. According to the present invention, the heat sink may alternatively be positioned by columnar heat sink positioning portions. Alternatively, a positioning structure other than the structure of inserting the positioning portions into the positioning holes may be employed so far as the heat sink can be positioned.

While the bezels and the resin frame are fastened together to the rear frame by the screw members in the aforementioned embodiment, the present invention is not restricted to this. According to the present invention, the bezels and the resin frame may alternatively be screwed to the rear frame separately. Alternatively, according to the present invention, the bezels and the resin frame may be fixed to the rear frame by means other than fastening by the screw members.

Similarly, while the heat sink is screwed to the rear frame by the screw members in the aforementioned embodiment, the present invention is not restricted to this. According to the present invention, the heat sink may alternatively be fixed to the rear frame by means other than fastening by the screw members.

While the substrate mounting member and the cover member are arranged in the region formed by the opening of the rear frame (rear side holding member) in the aforementioned embodiment, the present invention is not restricted to this. According to the present invention, a notch may alternatively be formed in the rear frame, and the substrate mounting member and the cover member may alternatively be arranged in a region formed by the notch.

What is claimed is:

1. A display device comprising:
    a display portion;
    a holding member made of resin, holding the display portion from a rear side, and formed with an opening or a notch;
    a substrate mounting member made of metal, mounted on the holding member, and mounted with a circuit substrate, a first protruding portion provided along an outer periphery of the substrate mounting member;
    a second protruding portion provided along an edge of the opening or an edge of the notch of the holding member; and
    a cover member provided separately from the substrate mounting member and the holding member, arranged in a region including the opening or the notch of the holding member, and covering the substrate mounting member from the rear side in a state where a rear surface of the holding member is exposed, wherein
    the holding member and the cover member constitute a rear chassis, and
    the substrate mounting member and the holding member are assembled in a state where the first protruding portion and second protruding portion are in contact with each other,
    the display portion further includes a heat radiation member made of sheet metal, the heat radiation member is fastened to the holding member in a state where the substrate mounting member and the heat radiation member are in contact with each other and in a state where the substrate mounting member is held between the heat radiation member and the holding member.

2. The display device according to claim 1, wherein the second protruding portion is arranged on the outer periphery of the substrate mounting member.

3. The display device according to claim 1, wherein the holding member has the region formed by the opening having a rectangular shape, and the substrate mounting member made of metal has a rectangular shape, is mounted with the circuit substrate having a rectangular shape, and is arranged in the region formed by the opening having the rectangular shape of the holding member.

4. The display device according to claim 1, wherein the circuit substrate is grounded through the substrate mounting member made of metal.

5. The display device according to claim 1, wherein a groove-like recess portion is formed on a portion of the holding member other than a portion formed with the second protruding portion.

6. The display device according to claim 5, wherein a stiffening rib extending in a direction intersecting with the groove-like recess portion is formed inside the groove-like recess portion.

7. The display device according to claim 1, wherein the first protruding portion has an inclined side wall.

8. The display device according to claim 1, further comprising an optical member arranged on a rear side of the display cell including a liquid crystal cell, wherein
    at least a positioning portion that positions the optical member is integrally formed on a front surface of the holding member, constituting the rear housing.

9. The display device according to claim 8, wherein
the optical member includes a reflective sheet reflecting light from a light source to the display cell and a light guide plate arranged on a surface of the reflective sheet, guiding the light from the light source to the display cell, and
the positioning portion includes a positioning rib arranged to circumferentially surround the reflective sheet and the light guide plate, to hold the reflective sheet and the light guide plate at a prescribed position.

10. The display device according to claim 9, wherein
the optical member further includes an optical sheet arranged between the display cell and the light guide plate, and
the positioning portion includes an optical sheet positioning portion formed to protrude from the front surface of the holding member toward the optical sheet to be inserted into a first hole formed in the optical sheet, to position the optical sheet.

11. The display device according to claim 8, wherein
the display panel further includes a bezel holding the display cell and the optical member from a front side and a resin frame arranged between the bezel and the holding member, and
a bezel fastening portion that fasten the bezel and the resin frame together to the holding member is also integrally formed on the front surface of the holding member.

12. The display device according to claim 1, wherein
a plurality of stiffening ribs are formed on a front surface of the holding member to intersect with each other in the form of a lattice.

13. The display device according to claim 1, wherein
the opening or the notch is arranged in a substantially central portion of the display portion in a longitudinal direction, as viewed in a direction perpendicular to a display surface of the display portion.

14. The display device according to claim 1, wherein
a length of the substrate mounting member is smaller than a length of the holding member in a longitudinal direction of the display portion, as viewed in a direction perpendicular to a display surface of the display portion.

15. The display device according to claim 1, wherein
a distance from a first end of the substrate mounting member to a first end of the holding member in a first direction along a long side of the display portion is substantially equal to a distance from a second end of the substrate mounting member to a second end of the holding member in a second direction opposite to the first direction.

* * * * *